United States Patent
Kim

(10) Patent No.: US 9,142,809 B2
(45) Date of Patent: Sep. 22, 2015

(54) BATTERY MODULE

(75) Inventor: Myung-Chul Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 941 days.

(21) Appl. No.: 13/272,134

(22) Filed: Oct. 12, 2011

(65) Prior Publication Data

US 2012/0171554 A1 Jul. 5, 2012

Related U.S. Application Data

(60) Provisional application No. 61/429,707, filed on Jan. 4, 2011.

(51) Int. Cl.

| H01M 10/6551 | (2014.01) |
|---|---|
| H01M 2/02 | (2006.01) |
| H01M 2/14 | (2006.01) |
| H01M 2/34 | (2006.01) |
| H01M 10/625 | (2014.01) |
| H01M 10/6563 | (2014.01) |
| H01M 10/647 | (2014.01) |
| H01M 10/6555 | (2014.01) |
| H01M 10/613 | (2014.01) |
| H01M 2/10 | (2006.01) |
| H01M 10/60 | (2014.01) |

(52) U.S. Cl.
CPC .......... *H01M 2/0245* (2013.01); *H01M 2/1077* (2013.01); *H01M 2/14* (2013.01); *H01M 2/345* (2013.01); *H01M 2/347* (2013.01); *H01M 10/613* (2015.04); *H01M 10/625* (2015.04); *H01M 10/647* (2015.04); *H01M 10/6551* (2015.04); *H01M 10/6555* (2015.04); *H01M 10/6563* (2015.04); *H01M 2/10* (2013.01); *H01M 10/60* (2015.04)

(58) Field of Classification Search
CPC .................... H01M 10/5055; H01M 10/5059
USPC ......................................... 429/120, 152–159
See application file for complete search history.

(56) References Cited

U.S. PATENT DOCUMENTS

| 6,899,975 B2 * | 5/2005 | Watanabe et al. ............. 429/156 |
| 2006/0204840 A1 | 9/2006 | Jeon et al. |
| 2007/0026303 A1 * | 2/2007 | Jeon et al. ..................... 429/143 |
| 2007/0133151 A1 * | 6/2007 | Jeon et al. ..................... 361/600 |

(Continued)

FOREIGN PATENT DOCUMENTS

| EP | 1701404 A1 | 9/2006 |
| JP | 2004-235110 A | 8/2004 |
| KR | 10-2001-0036652 | 5/2001 |

(Continued)

OTHER PUBLICATIONS

EPO Office Action dated May 4, 2012 issued in European Patent Application No. 12150051.6, 9 pages.

*Primary Examiner* — Maria J Laios
(74) *Attorney, Agent, or Firm* — Christie, Parker & Hale, LLP

(57) ABSTRACT

A battery module including a plurality of battery cells spaced apart in a first direction, and a barrier between adjacent battery cells of the plurality of battery cells, the barrier including a plate, and a protrusion extending from the plate in the first direction and contacting the adjacent battery cells, the protrusion including an elastomer.

18 Claims, 11 Drawing Sheets

(56) References Cited

U.S. PATENT DOCUMENTS

2008/0292950 A1  11/2008  Maeda et al.
2009/0061299 A1* 3/2009  Uchida et al. ................. 429/156

FOREIGN PATENT DOCUMENTS

KR  10-2006-0099216  9/2006
KR  10-2010-0081674  7/2010

* cited by examiner

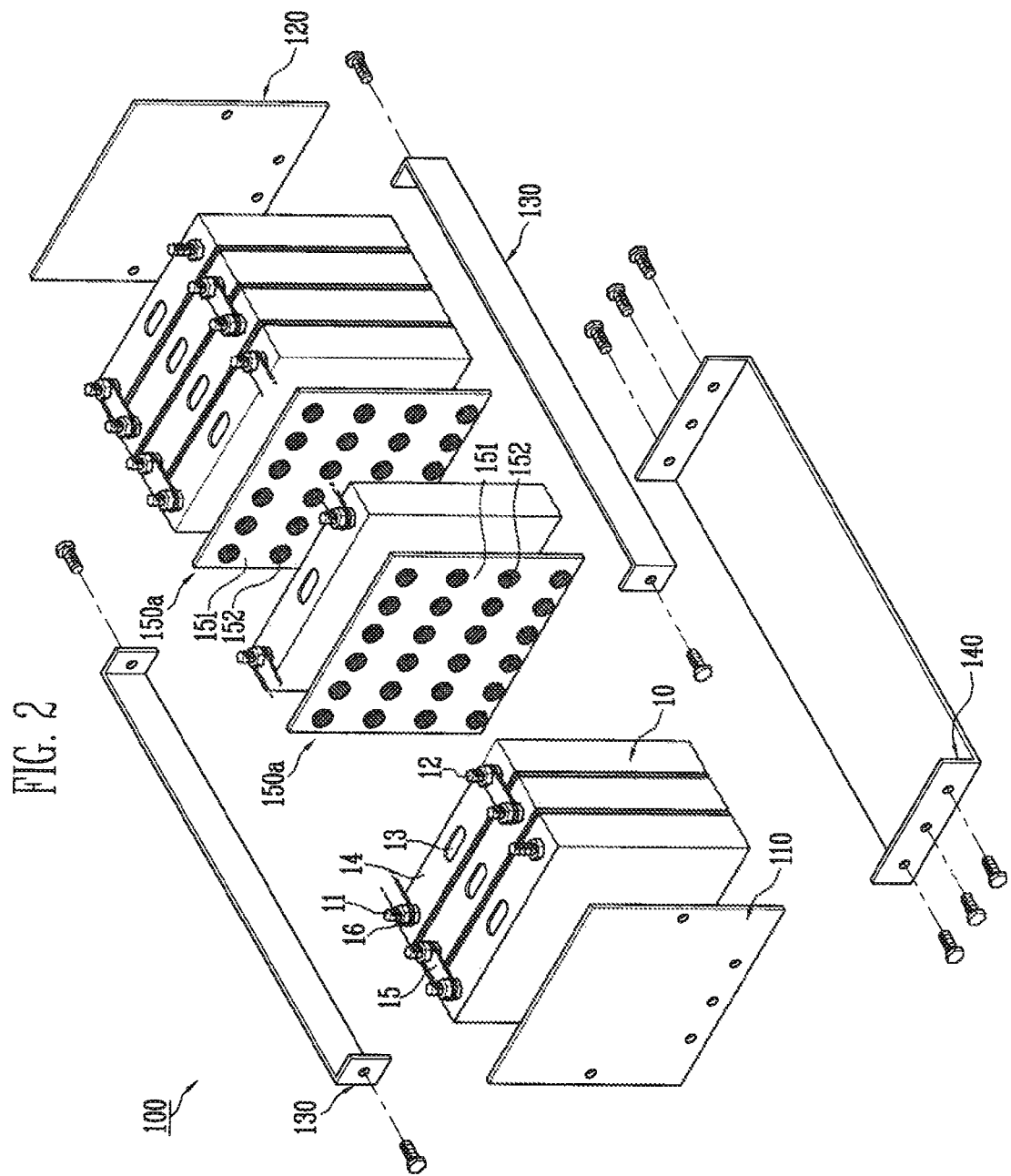

BATTERY MODULE

CROSS-REFERENCE TO RELATED APPLICATION

This application claims the benefit of U.S. Provisional Application No. 61/429,707, filed on Jan. 4, 2011 in the United States Patent and Trademark Office, the disclosure of which is incorporated herein in its entirety by reference.

BACKGROUND

1. Field

Aspects of embodiments of the present invention relate to a battery module, and more particularly, to a battery module including a plurality of battery cells and a barrier disposed between the battery cells.

2. Description of the Related Art

Recently, a high-output battery module using a high energy density nonaqueous electrolyte is being developed, and the high-output battery module is realized by a high-capacity battery module formed by connecting a plurality of battery cells in series so that the battery module may be used for devices using high power, such as a driving motor of an electric car.

A battery cell includes an electrode assembly formed of a positive plate, a negative plate, and an electrolyte and generates energy through an electrochemical reaction between the plates and the electrolyte. Here, gas may be generated in the battery cell due to a side reaction of the electrochemical reaction.

The gas may deform an external appearance of the battery cell and affect a shape of the battery module constituted by a plurality of arranged battery cells, interrupting or preventing secure fixing of the battery cells.

SUMMARY

According to an aspect of embodiments of the present invention, a battery module is light due to a novel barrier.

According to another aspect of embodiments of the present invention, a battery module includes a barrier configured to effectively control swelling of a battery cell.

According to an embodiment of the present invention, a battery module includes a plurality of battery cells spaced apart in a first direction, and a barrier between adjacent battery cells of the plurality of battery cells, the barrier including a plate, and a protrusion extending from the plate in the first direction and contacting the adjacent battery cells, the protrusion including an elastomer.

In one embodiment, the plate has an opening formed therethrough in the first direction, and the protrusion extends through the opening. The protrusion may include a first head contacting a first battery cell of the adjacent battery cells, and a connecting member coupled to the first head and extending through the opening.

The protrusion may further include a second head coupled to an end of the connecting member opposite the first head, the second head contacting a second battery cell of the adjacent battery cells. In one embodiment, the first head is formed of a first material, and the second head is formed of a second material different than the first material.

In one embodiment, the connecting member includes a first connecting member portion coupled to the first head, and a second connecting member portion coupled to the second head, and the first and second connecting member portions have substantially a same length in the first direction, the length of the first and second connecting member portions being less than or equal to approximately half of a thickness of the plate in the first direction.

The first head, the second head, and the connecting member may be integrally formed.

In one embodiment, the opening includes a plurality of openings arranged in a plurality of lines spaced apart from one another at intervals, the protrusion includes a plurality of protrusions extending through respective ones of the plurality of openings, and first heads of the plurality of protrusions arranged in at least one first line of the plurality of lines are formed of a first material, and first heads of the plurality of protrusions arranged in at least one second line of the plurality of lines adjacent and alternating with the at least one first line are formed of a second material different than the first material. The protrusions may further include second heads coupled to ends of the connecting members opposite the first heads, the second heads contacting a second battery cell of the adjacent battery cells, and the second heads of the plurality of protrusions arranged in the at least one first line may be formed of the second material, and the second heads of the plurality of protrusions arranged in the at least one second line may be formed of the first material.

The connecting member may contact a second battery cell of the adjacent battery cells.

A size of the connecting member may be substantially the same as a size of the opening.

The first head and the connecting member may be integrally formed.

In one embodiment, the first head includes a first end connected to the connecting member and a second end spaced from the connecting member, and a diameter of the first head at the first end is greater than a diameter of the opening, and a diameter of the first head at the second end is substantially the same as the diameter of the opening.

The connecting member may include a spring.

The opening may include a plurality of openings arranged in a plurality of lines spaced apart from one another, and the protrusion may include a plurality of protrusions extending through respective ones of the plurality of openings.

In one embodiment, the opening includes a plurality of openings spaced apart from one another, the protrusion includes a plurality of protrusions, each including a head and a connecting member coupled to the head and extending through a respective one of the plurality of openings, the head of a first protrusion of the plurality of protrusions contacts a first battery cell of the adjacent battery cells, and the head of a second protrusion of the plurality of protrusions contacts a second battery cell of the adjacent battery cells, and a connecting member of the first protrusion contacts the second battery cell, and a connecting member of the second protrusion contacts the first battery cell.

The elastomer may include at least one material selected from the group consisting of rubber, silicon, and polystyrene.

The elastomer may have a hardness of about 30 Hs to about 100 Hs according to the Korean Standard KS B 0807 ("METHOD OF SHORE HARDNESS TEST").

In one embodiment, a battery module further includes a housing containing the plurality of battery cells and the barrier, the housing including a first end plate at a first end of the battery module and contacting an outer surface of an outermost battery cell of the plurality of battery cells at the first end; a second end plate at a second end of the battery module and contacting an outer surface of an outermost battery cell of the plurality of battery cells at the second end; and at least one connection plate connecting the first end plate and the second end plate.

In one embodiment, the barrier further includes another protrusion, the another protrusion including a material different than the elastomer.

According to another embodiment of the present invention, a battery module includes a plurality of battery cells arranged in one direction, a barrier disposed between the plurality of battery cells; and a housing accommodating the battery cells and the barrier, wherein the barrier includes a plate including at least one opening and a protrusion formed to pass through the opening, and at least part of the protrusion is formed of an elastomer.

The opening may include a plurality of holes formed in the plate at regular intervals.

The plate may include a first side and a second side, and the protrusion may include a first head or a second head formed in the first side or the second side. Here, the protrusion may further include a connecting member connecting the first head to the second head and being formed to pass through the opening of the plate.

Further, the first head or the second head may have a round or polygonal tube shape.

Here, the first heads or the second heads may be formed at regular intervals.

One of the first head, the second head, and the connecting member may be formed of an elastomer.

Further, the first head and the connecting member may be formed of an elastomer and be integrated.

A plurality of rows of the first heads or a plurality of rows of the second heads may be arranged in lines on the first side or the second side of the plate, and the rows of the first heads and the rows of the second heads may be alternately arranged on the same side.

The first head and the second head may be connected by the connecting member and be integrated.

The connecting member may be formed to have a size corresponding to that of the opening of the plate.

The connecting member may include a spring.

The elastomer may include one of rubber, silicon, and polystyrene.

The elastomer may have a hardness of 30 Hs to 200 Hs.

The housing may include a pair of first and second end plates disposed outside the battery cells, and a side plate and a bottom plate connecting the first and second end plates.

According to another embodiment of the present invention, a barrier for separating battery cells of a battery module includes a plate, and a protrusion extending from the plate in a first direction and contactable with the battery cells, the protrusion including an elastomer. In one embodiment, the plate has an opening formed therethrough in the first direction, and the protrusion extends through the opening. The protrusion may include a first head contacting a first battery cell of the battery cells, and a connecting member coupled to the first head and extending through the opening. The protrusion may further include a second head coupled to an end of the connecting member opposite the first head, the second head contacting a second battery cell of the battery cells. The connecting member may include a spring. The elastomer may include at least one material selected from the group consisting of rubber, silicon, and polystyrene.

According to an aspect of embodiments of the present invention, a battery module uses a novel barrier, such that the battery module effectively cools battery cells and is light.

Further, according to other aspects of embodiments of the present invention, a battery module effectively prevents or reduces swelling of battery cells to improve reliability of the battery cells and enhances production efficiency.

BRIEF DESCRIPTION OF THE DRAWINGS

The above and other features and advantages will become more apparent to those of ordinary skill in the art by describing in detail some exemplary embodiments of the present invention with reference to the attached drawings. Moreover, additional aspects and/or advantages of embodiments of the present invention are set forth in the following description and accompanying drawings, or may be obvious in view thereof to those skilled in the art.

FIG. 2 is an exploded perspective view of the battery module of FIG. 1;

DETAILED DESCRIPTION

Figure 1:
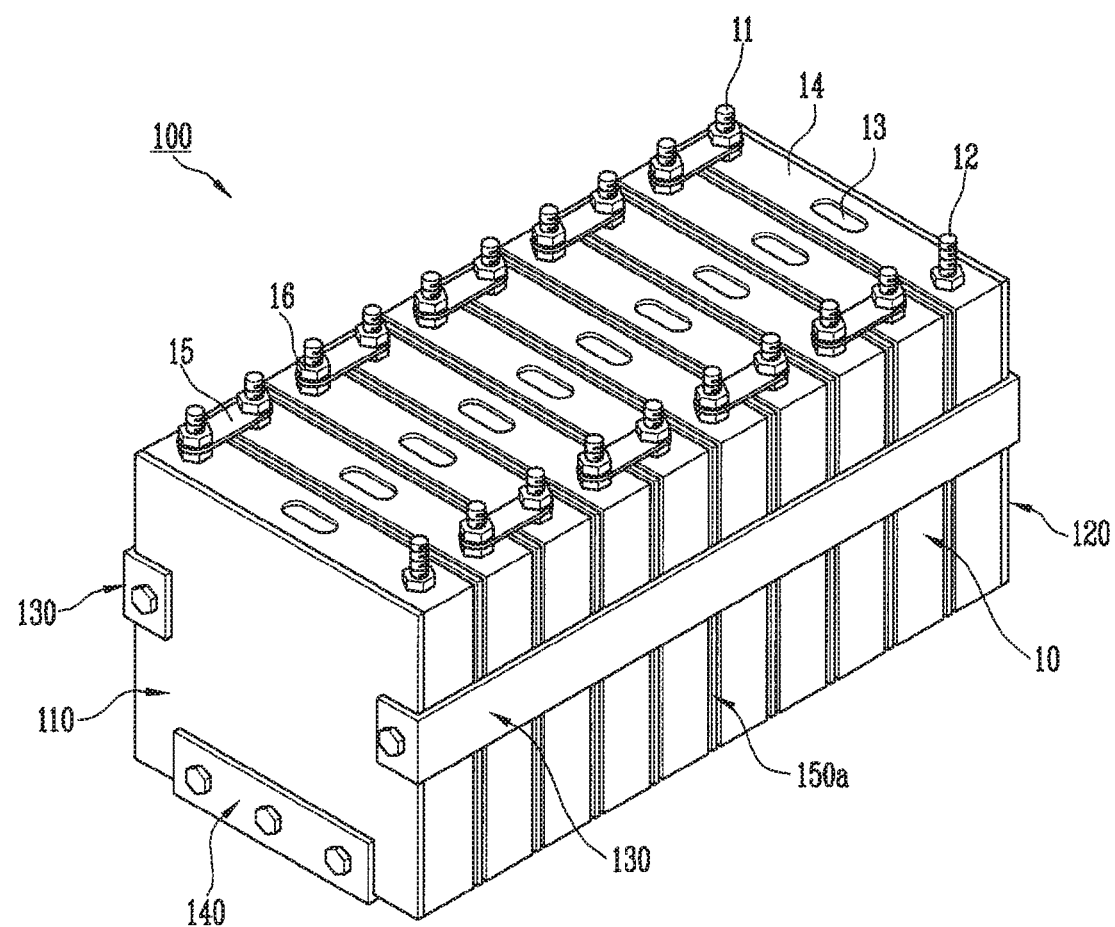
FIG. 1 is a perspective view of a battery module according to an exemplary embodiment of the present invention.

In the following detailed description, some exemplary embodiments of the present invention are shown and described, by way of illustration. As those skilled in the art would realize, the described embodiments may be modified in various ways without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements.

Referring to FIGS. 1 to 3D, an exemplary embodiment of the present invention is described.

FIG. 1 is a perspective view of a battery module according to an exemplary embodiment of the present invention, and FIG. 2 is an exploded perspective view of the battery module of FIG. 1.

Referring to FIGS. 1 and 2, a battery module 100 according to an embodiment of the present invention includes a plurality of battery cells 10 arranged in one direction; a barrier 150a disposed between the plurality of battery cells 10 (e.g., between adjacent battery cells 10 of the plurality of battery cells 10); and a housing 110, 120, 130, and 140 accommodating the battery cells 10 and the barrier 150a. The barrier 150a includes a plate 151 having at least one opening 151a, and a protrusion 152 formed to pass through the opening, wherein at least part of the protrusion 152 includes an elastomer.

The battery cells 10 may be formed by accommodating an electrode assembly and an electrolyte in a battery case and sealing the battery case with a cap assembly 14. The cap assembly 14 may include a positive terminal 11 and a negative terminal 12 which are formed on opposite end portions of the cap assembly 14 and a vent 13 formed between the positive and negative terminals 11 and 12. The electrode assembly, in one embodiment, includes a positive plate, a negative plate, and a separator disposed between the plates. The positive plate is connected to the positive terminal 11, and the negative plate is connected to the negative terminal 12, so that energy generated by an electrochemical reaction of the electrode assembly and the electrolyte is transmitted to the outside of the battery cell 10. Further, the vent 13 functions as a path through which gas generated in the battery cell 10 may be discharged to the outside of the battery cell 10.

The housing 110, 120, 130, and 140 fixes the plurality of battery cells 10 and the barrier 150a to form the battery module 100. The housing 110, 120, 130, and 140 may be formed of a pair of first and second end plates 110 and 120 disposed at outside ends of the plurality of battery cells 10, and at least one side plate 130 and a bottom plate 140 connecting the first and second end plates 110 and 120 to each other.

In one embodiment, the first and second end plates 110 and 120, a pair of side plates 130, and the bottom plate 140 form a space to accommodate the battery cells 10, and the battery cells 10 are arranged in one direction within the housing 110, 120, 130, and 140. In one embodiment, the battery cells 10 are arranged side by side with wide front sides facing each other. In one embodiment, the positive terminal 11 or the negative terminal 12 of two neighboring battery cells 10 are electrically connected through a bus bar 15. The bus bar 15 includes a pair of holes through which the positive terminal 11 and the negative terminal 12 pass, and the bus bar 15 with the positive terminal 11 and the negative terminal 12 passing through the holes to be connected may be fixed by a nut 16 or the like.

In one embodiment, the pair of side plates 130 supports opposite lateral sides of the battery cells 10, and the bottom plate 140 supports a bottom side of the battery cells 10. End portions of the side plates 130 and the bottom plate may be respectively coupled with the first end plate 110, and opposite end portions thereof may be coupled with the second end plate 120, so that the first and second end plates 110 and 120 are connected to each other. Coupling may be made using a bolt and a nut, for example, but is not limited thereto.

The first and second end plates 110 and 120, in one embodiment, are disposed to be in surface contact with battery cells 10 disposed at opposite ends to press the plurality of battery cells 10 together. In one embodiment, the battery cells 10 supported by the first and second end plates 110 and 120 are arranged with the positive terminals 11 and the negative terminals 12 being alternately disposed, so that neighboring terminals are connected in series.

The housing 110, 120, 130, and 140 formed of the first and second end plates 110 and 120, the pair of side plates 130, and the bottom plate 140 is provided to stably fix the battery cells 10 and may be modified variously, and is not limited to the above-described configuration. Further, a connection structure and a number of battery cells 10 may be varied based on a design of the battery module 100.

Figure 3A:
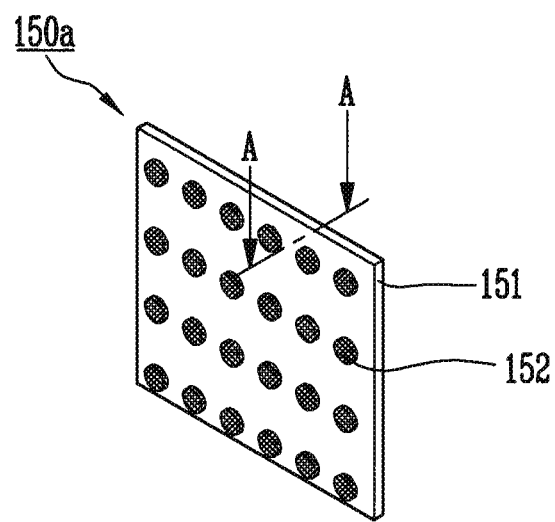
FIG. 3A is a perspective view of a barrier of a battery module according to an exemplary embodiment of the present invention.
Figure 3B:
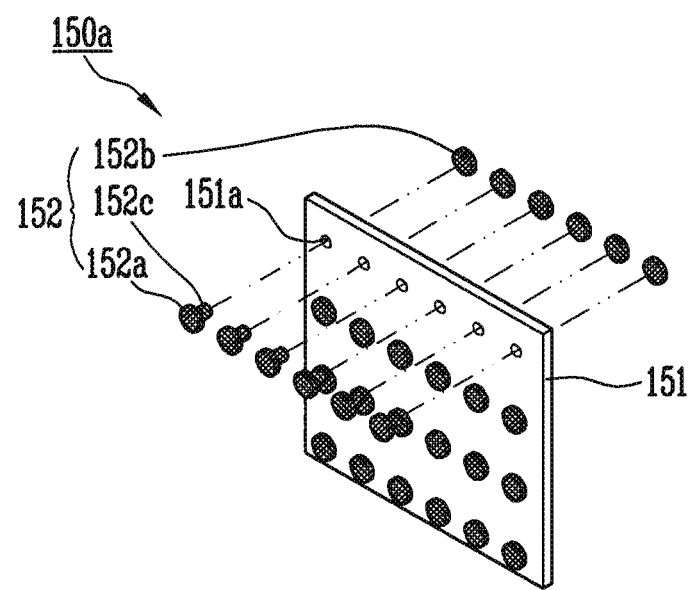
FIG. 3B is an exploded perspective view of the barrier of FIG. 3A.
Figure 3C:
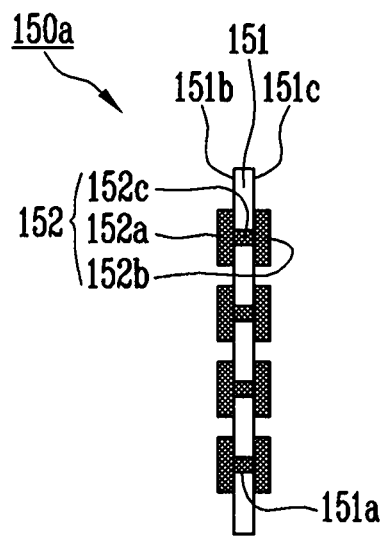
FIG. 3C is a cross-sectional view of the barrier of FIG. 3A, taken along the line A-A.
Figure 3D:
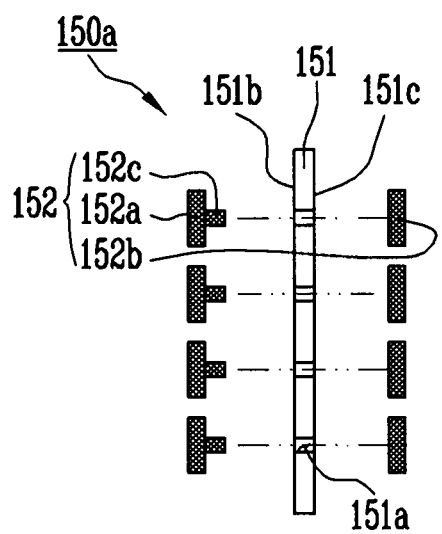
FIG. 3D is an exploded cross-sectional view of the barrier of FIG. 3C.

FIG. 3A is a perspective view of a barrier according to an embodiment of the present invention; FIG. 3B is an exploded perspective view of the barrier of FIG. 3A; FIG. 3C is a cross-sectional view taken along a line A-A of FIG. 3A; and FIG. 3D is an exploded cross-sectional view of FIG. 3C.

Referring to FIGS. 3A to 3D, the barrier 150a disposed between the plurality of battery cells 10 may include the plate 151 having the at least one opening 151a, and the protrusion 152 formed to pass through the opening 151a. At least part of the protrusion 152 includes an elastomer.

The barrier 150a is disposed between two neighboring battery cells 10 to space the battery cells 10 from each other. Thus, a space may be formed between the battery cells 10 due to the barrier 150a. The space may function as a path to discharge heat therethrough so that heat generated in the battery cells 10 due to charging and discharging is not accumulated. Further, the space may be a path of a heat transmission medium for cooling or heating of the battery cells 10.

In one embodiment, a plurality of the openings 151a may be formed at regular intervals. The plate 151 includes a first side 151b and a second side 151c. The protrusion 152 may include a first head 152a or a second head 152b formed on the first side 151b or the second side 151c. Further, the protrusion 152 may further include a connecting member 152c connecting the first head 152a and the second head 152b and formed to pass through the opening 151a.

The first head 152a or the second head 152b may have a round or polygonal tube shape, and the first heads 152a or the second heads 152 may be formed on the plate 151 at regular intervals. However, the present invention is not limited thereto and, in other embodiments, the protrusions 152 may have any other suitable shapes and spacing from one another.

Generally, the battery cells 10 use a structure of pressing the battery cells 10 at a predetermined pressure or greater in order to control swelling of the battery cells 10 occurring due to charging and discharging processes. Further, neighboring battery cells 10 are spaced such that the battery cells 10 may be heated or heat may be discharged from the battery cells 10. Thus, the barrier 150a having an approximately corresponding size to the battery cells 10 is disposed between the battery cells 10. In one embodiment, the barrier 150a includes the protrusion 152 and the plate 151 supporting the protrusion 152. Further, the barrier 150a may be disposed so that the protrusion 152 is in direct contact with the battery cells 10.

When the battery module 100 is formed, an insulating process may be applied to at least one of the battery cells 10 and the protrusion 152 to prevent or substantially prevent a short circuit from occurring therebetween. In one embodiment, the insulating process may be achieved by providing tubing on a surface of the battery cells 10 using a nonconductive material or an insulating film. However, the tubing formed on the external surface of the battery cells 10 may be broken by external impact or may be damaged by friction between the protrusion 152 and the battery cell 10 due to vibrations in the battery module 100. When the tubing is damaged, the battery cells 10 may electrically short-circuit with the outside, and an external appearance of the battery cells 10 may become deformed.

The barrier 150a includes the protrusion 152, a part being in direct contact with the battery cells 10, at least part of which may be formed of an elastomer. Generally, the elastomer is a material which may be restored from deformation by external force and has excellent anti-attrition, elongation, and impact strength.

At least one of the first head 152a, the second head 152b, and the connecting member 152c of the protrusion 152 may be formed of an elastomer. In one embodiment, the first head 152a and the connecting member 152c may be formed of an elastomer, and may be integrally formed or formed separately.

In one embodiment, when the first head 152a and the connecting member 152c are integrated, the connecting member 152c passes through the opening 151a so that the first head 152a is disposed on the first side 151b of the plate 151, and then the second head 152b is coupled with the connecting member 152c passing through the opening 151a on the second side 151c of the plate 151, thus manufacturing the barrier 150a.

In one embodiment, the connecting member 152c may have a corresponding shape to the opening 151a of the plate 151. The connecting member 152c, in one embodiment, connects and fixes the first head 152a and the second head 152b disposed on the first side 151b and the second side 151c of the barrier 150a, respectively, the connecting member 152c passing through the opening 151a of the plate 151. The connecting member 152c may have a size at least long enough to pass through the opening 151a, but, in one embodiment, has a corresponding size to the opening 151a in order to stably fix the first head 152a and the second head 152b and to improve anti-vibration in the battery module 100.

In one embodiment, an end portion of the connecting member 152c which is not connected to the first head 152a and a portion of the second head 152b corresponding to the end portion of the connecting member 152c may each further include a coupling part. The coupling parts may be provided to couple and fix the connecting member 152c and the second head 152b, and the coupling part provided on the end portion of the connecting member 152c may be correspondingly coupled with the coupling part provided on the second head 152b. For example, the coupling parts may include a groove-protrusion combination, a hook combination, a screw combination, or the like, or any other suitable coupling device.

The elastomer forming at least part of the protrusion 152 may have a hardness of 30 Hs to 100 Hs. The elastomer may include, for example, at least one of rubber, silicon, and polystyrene. When the hardness of the elastomer is less than 30 Hs, the elastomer has inferior durability, so that the elastomer part of the protrusion 152 may be easily worn out or damaged. When the hardness of the elastomer is more than 100 Hs, the protrusion 152 has an inflexible structure, such that anti-vibration is not sufficiently effective and the tubing of the battery cells 10 may be damaged by external force or vibrations to cause a short circuit.

Hereinafter, other exemplary embodiments of the barrier of the present invention are described with reference to FIGS. 4A to 9C. Except as described below, configurations and aspects of the barriers of the embodiments of FIGS. 4A to 9C are similar to the barrier 150a described above with reference to FIGS. 1 to 3D, and, therefore, are not repeated.

Figure 4A:
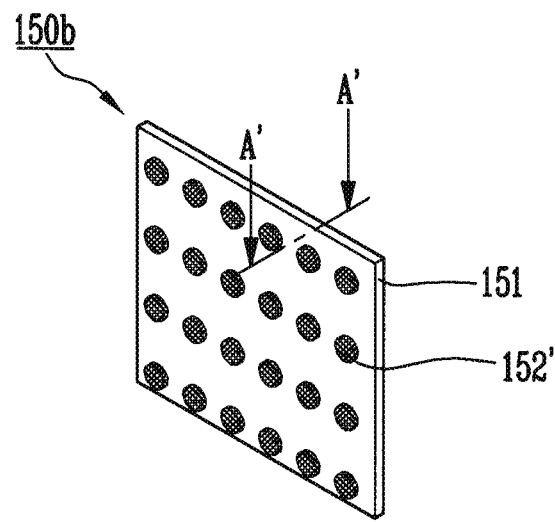
FIG. 4A is a perspective view of a barrier according to another exemplary embodiment of the present invention.
Figure 4B:
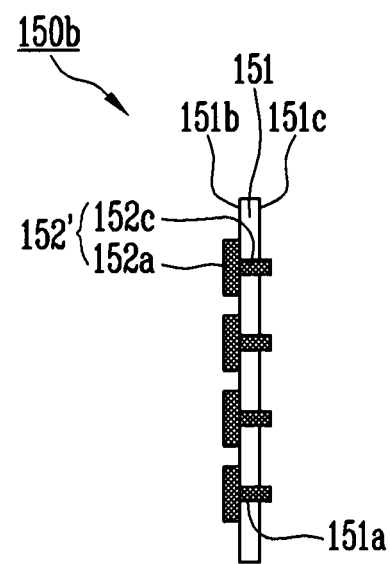
FIG. 4B is a cross-sectional view of the barrier of FIG. 4A, taken along the line A'-A'.

FIG. 4A is a perspective view of a barrier according to another embodiment of the present invention, and FIG. 4B is a cross-sectional view taken along a line A'-A' of FIG. 4A.

Referring to FIGS. 4A and 4B, a barrier 150b may include the plate 151 having at least one opening 151a and a protrusion 152' formed to pass through the opening 151a. At least part of the protrusion 152' is formed of an elastomer. The protrusion 152' includes the first head 152a formed on the first side 151b or the second side 151c of the plate 151. Further, the protrusion 152' includes the connecting member 152c passing through the opening 151a and being integrated with the first head 152a.

In the protrusion 152', only the first head 152a is formed on the first side 151b of the plate 151, but a second head is not present on the second side 151c of the plate 151. In one embodiment, an end portion of the connecting member 152c of the protrusion 152' is exposed on the second side 151c. Thus, battery cells facing the second side 151c are spaced by the exposed end portion of the connecting member 152c, such that a space between the battery cells is formed. The connecting member 152c may be integrated with the first head 152a, and a process of forming a second head, as described above, is omitted, and thus the protrusion 152' may be formed via a single process, improving processing efficiency. The connecting member 152c may be fixed by friction between the connecting member 152c and the opening 151a of the plate 151 without a second head.

Figure 5A:
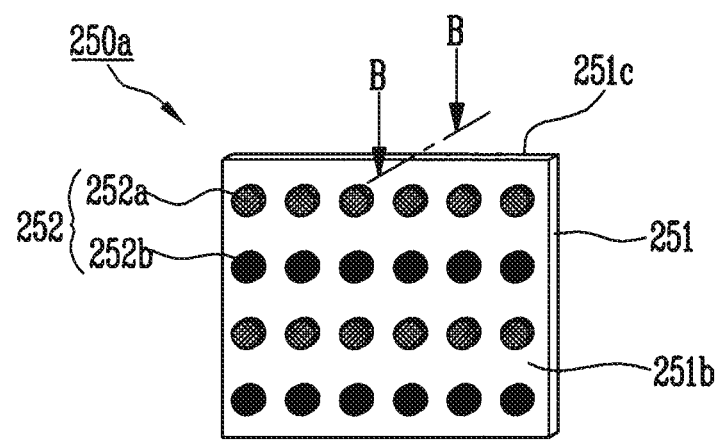
FIG. 5A is a front perspective view of a barrier according to another exemplary embodiment of the present invention.
Figure 5B:
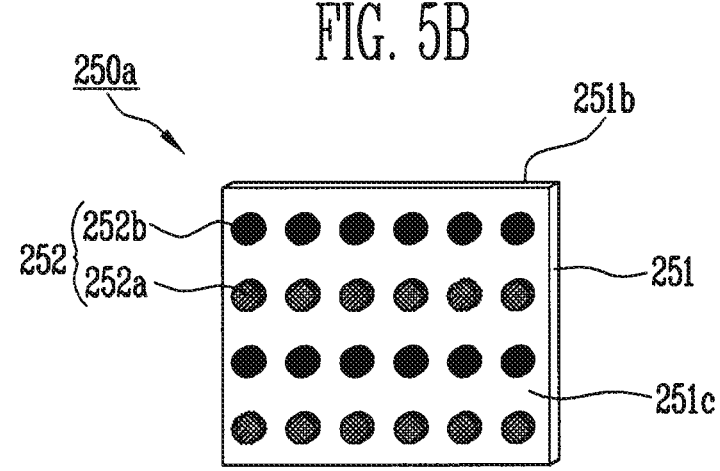
FIG. 5B is a rear perspective view of the barrier of FIG. 5A.
Figure 5C:
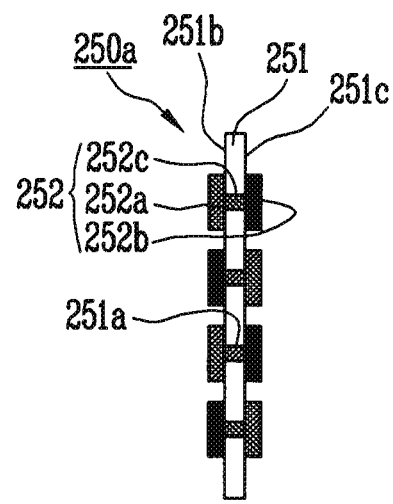
FIG. 5C is a cross-sectional view of the barrier of FIG. 5A, taken along the line B-B.
Figure 5D:
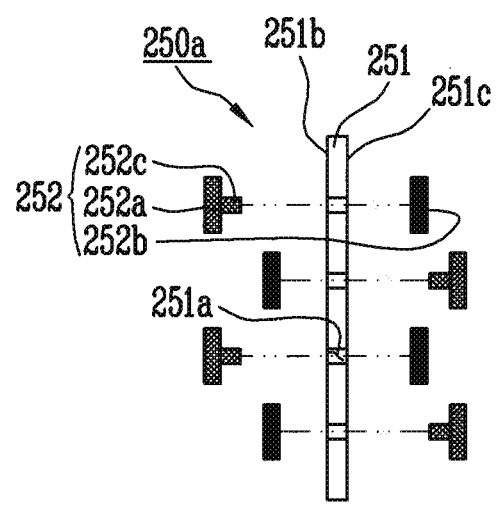
FIG. 5D is an exploded cross-sectional view of the barrier of FIG. 5C.

FIG. 5A is a perspective view of one side of a barrier according to another exemplary embodiment of the present invention; FIG. 5B is a perspective view of another side of the barrier of FIG. 5A; FIG. 5C is a cross-sectional view taken along a line B-B of FIG. 5C; and FIG. 5D is an exploded cross-sectional view of FIG. 5C.

Referring to FIGS. 5A to 5D, a barrier 250a according to one embodiment includes a plate 251 having at least one opening 251a and a protrusion 252 formed to pass through the opening 251a. At least part of the protrusion 252 is formed of an elastomer.

The plate 251 includes a first side 251b and a second side 251c, and the protrusion 252 may include a first head 252a or a second head 252b formed on the first side 251b or the second side 251c. Further, the protrusion 252 may further include a connecting member 252c connecting the first head 252a and the second head 252b and may be integrated with the first head 252a. A plurality of the first heads 252a or the second heads 252b may be arranged in one or more lines (e.g., rows or columns) on the first side 251b or the second side 251c of the plate 251, and, in one embodiment, lines of the first heads 252a and lines of the second heads 252b may be alternately arranged on the same side.

In one embodiment, the first head 252a and the second head 252b may be formed of different materials. For example, the first head 252a and the second head 252b may be formed of different elastomers, or at least one of the first head 252a and the second head 252b may be formed an elastomer and the other of the first head 252a and the second head 252b may be formed of a different material. The connecting member 252c may also be formed of a different material from at least one of the first head 252a or the second head 252b. In one embodiment, the connecting member 252c is integrated with the first head 252a and includes the same material as the first head 252a.

The first head 252a integrated with the connecting member 252c may be formed on the first side 251b or the second side 251c of the plate 251 to pass through the opening 251a. The connecting member 252c passing through the opening 251a may be coupled with the second head 252b on the second side 251c or the first side 251b. In one embodiment, the first heads 252a are formed on both the first side 251b and the second side 251c, and one or more of the first heads 252a arranged in a line and one or more of the second heads 252b arranged in a line may be alternately disposed on the first side 251b. However, the present invention is not limited to the first heads 252a and the second heads 252b being arranged in lines and, in other embodiments, the first heads 252a and the second heads 252b may be arranged in any other suitable pattern.

The coupling may be performed by a groove-protrusion combination, a hook combination, a screw combination, or the like. Here, materials or arrangements of the first heads 252a and the second heads 252b may be modified based on a design of the battery module, for example, such as a channel of a refrigerant, anti-vibration of the battery cells, or the like.

Figure 6A:
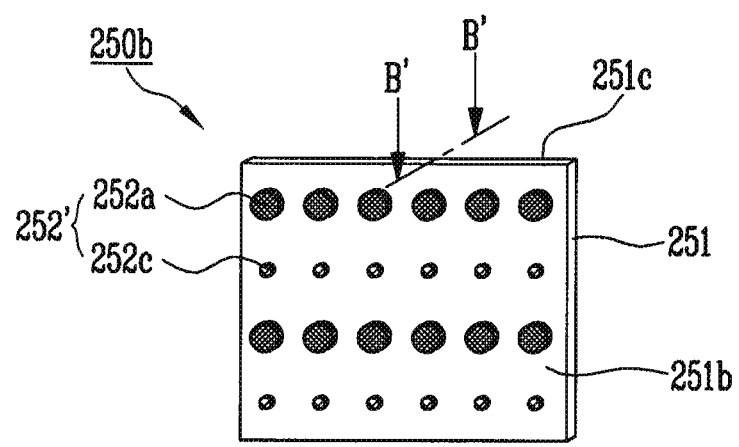
FIG. 6A is a perspective view of a barrier according to another exemplary embodiment of the present invention.
Figure 6B:
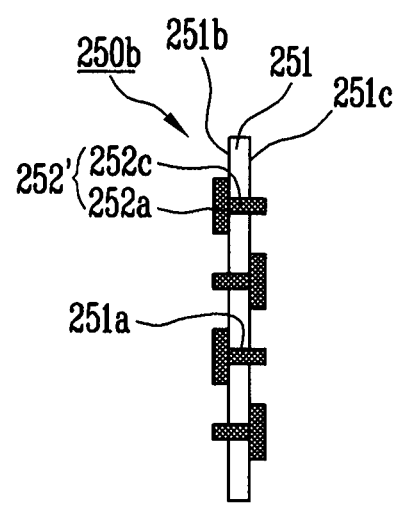
FIG. 6B is a cross-sectional view of the barrier of FIG. 6A, taken along the line B'-B'.

FIG. 6A is a perspective view of a barrier according to another exemplary embodiment of the present invention, and FIG. 6B is a cross-sectional view taken along a line B'-B' of FIG. 6A.

Referring to FIGS. 6A and 6B, a barrier 250b according to one embodiment includes the plate 251 having the at least one opening 251a and a protrusion 252' formed to pass through the opening 251a. At least part of the protrusion 252' is formed of an elastomer.

The plate 251 includes the first side 251b and the second side 251c, and the protrusion 252' includes the first head 252a and the connecting member 252c. A plurality of first heads 252a may be arranged in lines (e.g., rows or columns) on the first side 251b or the second side 251c of the plate 251, and the first heads 252a may be omitted in alternating (e.g., even-numbered) lines on one of the first side 251b or the second side 251c and in alternating (e.g., odd-numbered) lines on the other of the first side 251b or the second side 251c. In one embodiment, the protrusions 252' may be provided only in odd-numbered rows on the first side 251b and may be provided only in even-numbered rows on the second side 251c, and end portions of the first heads 252a and end portions of the connecting members 252c may be alternately arranged in different rows on the first side 251b or the second side 251c. Also, the present invention is not limited to the first heads 252a and the connecting members 252c being arranged in lines and, in other embodiments, the first heads 252a and the connecting members 252c may be arranged in any other suitable pattern.

Figure 7A:
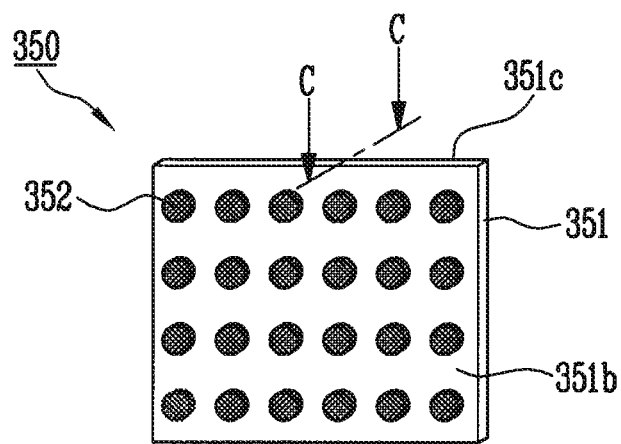
FIG. 7A is a perspective view of a barrier according to another exemplary embodiment of the present invention.
Figure 7B:
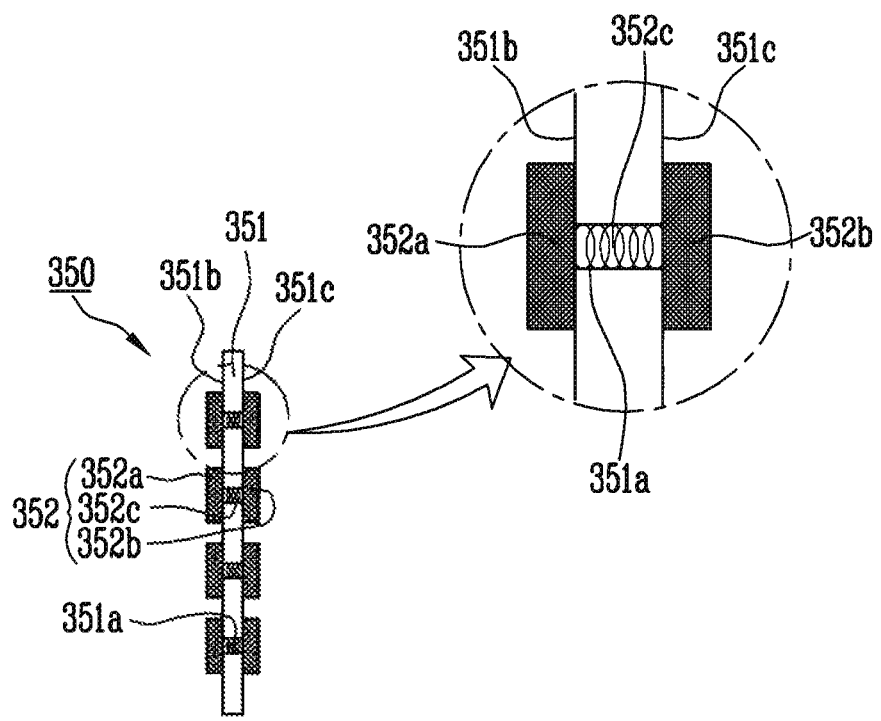
FIG. 7B is a cross-sectional view of the barrier of FIG. 7A, taken along the line C-C.

FIG. 7A is a perspective view of a barrier according to another exemplary embodiment of the present invention, and FIG. 7B is a cross-sectional view taken along a line C-C of FIG. 7A.

Referring to FIGS. 7A and 7B, a barrier 350 may include a plate 351 including a first side 351b, a second side 351c, and at least one opening 351a formed to extend from the first side 351b to the second side 351c. The barrier 350 may include a protrusion 352 formed to pass through the opening 351a. At least part of the protrusion 352 is formed of an elastomer.

The protrusion 352 may include a first head 352a and a second head 352b formed on the first side 351b and the second side 351c of the plate 351, respectively, and a connecting member 352c connecting the first head 352a to the second head 352b. Further, the connecting member 352c may include a spring.

The connecting member 352c is formed to pass through the opening 351a of the plate 351 and connects the first head 352a to the second head 352b to fix the first head 352a and the second head 352b on the plate 351. In one embodiment, the connecting member 352c includes a spring to be used regardless of a change in a thickness of the plate 351. That is, the connecting member 352c includes a spring having superior elasticity to be free from limitations in a size of the barrier 350, and may reduce defects due to assembly tolerances.

Figure 8A:
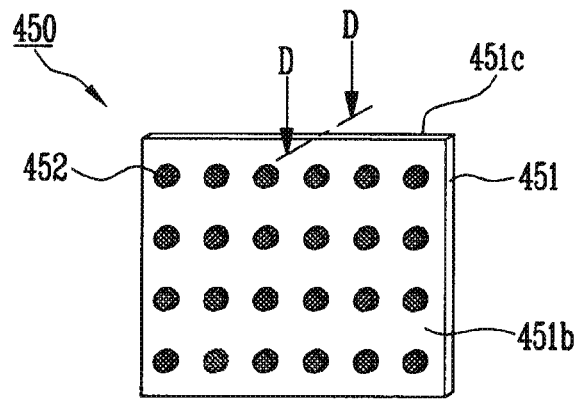
FIG. 8A is a perspective view of a barrier according to another exemplary embodiment of the present invention.
Figure 8B:
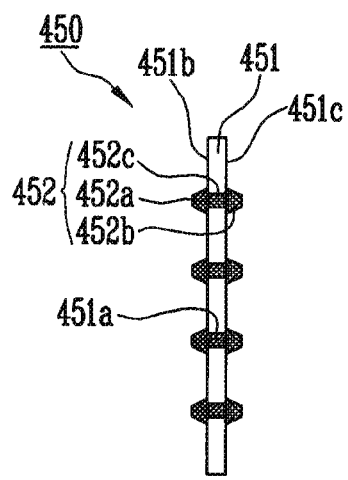
FIG. 8B is a cross-sectional view of the barrier of FIG. 8A, taken along the line D-D.

FIG. 8A is a perspective view of a barrier according to another exemplary embodiment of the present invention; FIG. 8B is a cross-sectional view taken along a line D-D of FIG. 8A; and FIG. 8C is an exploded cross-sectional view of FIG. 8B.

Figure 8C:
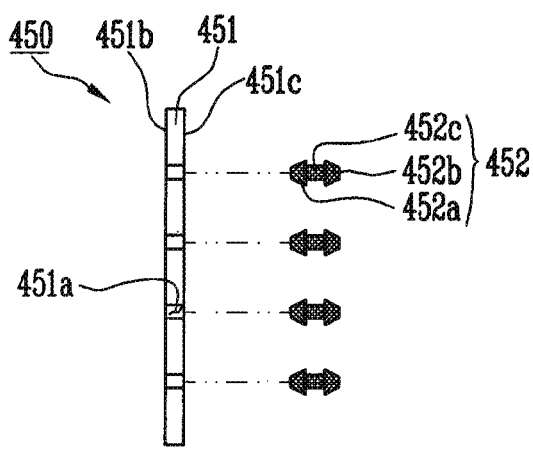
FIG. 8C is an exploded cross-sectional view of the barrier of FIG. 8B.

Referring to FIGS. 8A to 8C, a barrier 450 includes a plate 451 including a first side 451b, a second side 451c, and at least one opening 451a formed to extend from the first side 451b to the second side 451c. The barrier 450 includes a protrusion 452 formed to pass through the opening 451a. At least part of the protrusion 452 is formed of an elastomer.

The protrusion 452 may include a pair of a first head 452a and a second head 452b, and a connecting member 452c connecting the first head 452a to the second head 452b. In one embodiment, the first head 452a, the second head 452b, and the connecting member 452c may be integrally formed.

In one embodiment, the protrusion 452 includes an elastomer, and thus an external shape thereof may be easily transformed by an external force. Thus, the protrusion 452 in which the first head 452a, the second head 452b, and the connecting member 452c are integrated may pass through the opening 451a on the first side 451b or the second side 451c of the plate 451.

Further, at least one of the first head 451b or the second side 451c may have a tapering cross-sectional shape to easily pass through the opening 451a. That is, an end portion of the first head 452a or the second head 452b which is not connected to the connecting member 452c has a smaller diameter or an approximately same diameter as the opening 451a to easily pass through the opening 451a. Further, another end portion of the first head 452a or the second head 452b which is connected to the connecting member 452c has a larger diameter than the opening 451a to be fixed on an outer side of the opening 451a, such that the protrusion 452 is not separated from the plate 451 after passing through the opening 451a. That is, the other end portion of the first head 452a or the second head 452b which is formed to be larger than the opening 451a abuts the plate 451 at an entrance of the opening 451a, such that the protrusion 452 may be stably fixed to the plate 451.

Figure 9A:
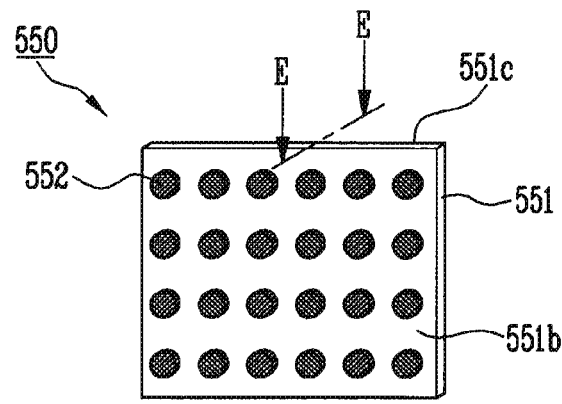
FIG. 9A is a perspective view of a barrier according to another exemplary embodiment of the present invention.
Figure 9B:
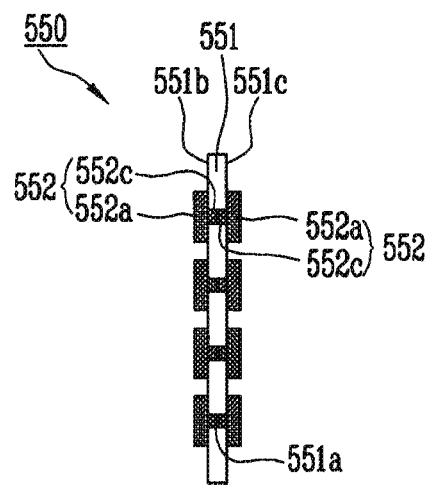
FIG. 9B is a cross-sectional view of the barrier of FIG. 9A, taken along the line E-E.

FIG. 9A is a perspective view of a barrier according to another exemplary embodiment of the present invention; FIG. 9B is a cross-sectional view taken along a line E-E of FIG. 9A; and FIG. 9C is an exploded perspective view of FIG. 9B.

Figure 9C:
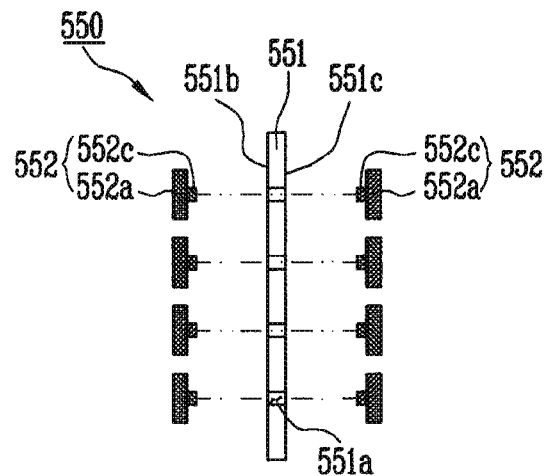
FIG. 9C is an exploded cross-sectional view of the barrier of FIG. 9B.

Referring to FIGS. 9A to 9C, a barrier 550 according to one embodiment includes a plate 551 having at least one opening 551a formed between a first side 551b and a second side 551c, and a protrusion 552 formed to pass through the opening 551a. At least part of the protrusion 552 is formed of an elastomer.

In one embodiment, the protrusion 552 includes a first head 552a and a connecting member 552c connected to the first head 552a. The connecting member 552c may be integrated with the first head 552a or may be formed separately.

The connecting member 552c may have a length that is approximately half of a length of the opening 551a or less. Further, protrusions 552 formed of the first head 552a and the connecting member 552c are provided both on the first side 551b and the second side 551c of the plate 551, and connecting members 552c in the opening 551a on each of the first side 551b and the second side 551c face each other in the opening 551a. Thus, the same protrusions 552 may be used to decrease manufacturing costs of the battery module, reducing production costs.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery module comprising:
    a plurality of battery cells spaced apart in a first direction; and
    a barrier between adjacent battery cells of the plurality of battery cells, the barrier comprising:
        a plate having a plurality of openings formed therethrough from a first side of the plate to a second side of the plate opposite the first side; and
        a plurality of protrusions extending through respective openings of the plurality of openings in the first direction and contacting a first battery cell of the adjacent battery cells at the first side of the plate and a second battery cell of the adjacent battery cells at the second side of the plate,
        wherein each of the protrusions comprises an elastomer, and
    wherein the barrier further comprises another protrusion, the another protrusion comprising a material different than the elastomer.

2. The battery module of claim 1,
    wherein openings of the plurality of openings are arranged in a plurality of lines spaced apart from one another.

3. The battery module of claim 1,
    wherein openings of the plurality of openings are spaced apart from one another,
    wherein each of the protrusions comprises a head and a connecting member coupled to the head and extending through a respective one of the plurality of openings,
    wherein the head of a first protrusion of the plurality of protrusions contacts the first battery cell of the adjacent battery cells, and the head of a second protrusion of the plurality of protrusions contacts the second battery cell of the adjacent battery cells, and
    wherein a connecting member of the first protrusion contacts the second battery cell, and a connecting member of the second protrusion contacts the first battery cell.

4. The battery module of claim 1, wherein the elastomer comprises at least one material selected from the group consisting of rubber, silicon, and polystyrene.

5. The battery module of claim 1, wherein the elastomer has a hardness of about 30 Hs to about 100 Hs.

6. The battery module of claim 1, further comprising a housing containing the plurality of battery cells and the barrier, the housing comprising:
    a first end plate at a first end of the battery module and contacting an outer surface of an outermost battery cell of the plurality of battery cells at the first end;
    a second end plate at a second end of the battery module and contacting an outer surface of an outermost battery cell of the plurality of battery cells at the second end; and
    at least one connection plate connecting the first end plate and the second end plate.

7. The battery module of claim 1, wherein each of the protrusions comprises:
    a first head contacting the first battery cell of the adjacent battery cells; and
    a connecting member coupled to the first head and extending through the respective opening.

8. The battery module of claim 7, wherein the connecting member contacts the second battery cell of the adjacent battery cells.

9. The battery module of claim 7, wherein a size of the connecting member is substantially the same as a size of the respective opening.

10. The battery module of claim 7, wherein the first head and the connecting member are integrally formed.

11. The battery module of claim 7,
    wherein the first head comprises a first end connected to the connecting member and a second end spaced from the connecting member, and
    wherein a diameter of the first head at the first end is greater than a diameter of the respective opening, and a diameter of the first head at the second end is substantially the same as the diameter of the respective opening.

12. The battery module of claim 7, wherein the connecting member comprises a spring.

13. The battery module of claim 7, wherein each of the protrusions further comprises a second head coupled to an end of the connecting member opposite the first head, the second head contacting the second battery cell of the adjacent battery cells.

14. The battery module of claim 13,
    wherein the connecting member comprises a first connecting member portion coupled to the first head, and a second connecting member portion coupled to the second head, and
    wherein the first and second connecting member portions have substantially a same length in the first direction, the length of the first and second connecting member portions being less than or equal to approximately half of a thickness of the plate in the first direction.

15. The battery module of claim 13, wherein the first head, the second head, and the connecting member are integrally formed.

16. A battery module comprising:
    a plurality of battery cells spaced apart in a first direction; and
    a barrier between adjacent battery cells of the plurality of battery cells, the barrier comprising:
        plate having a plurality of openings formed therethrough from a first side of the plate to a second side of the plate opposite the first side; and
        a plurality of protrusions extending through respective openings of the plurality of openings in the first direction and contacting a first battery cell of the adjacent battery cells at the first side of the plate and a second battery cell of the adjacent battery cells at the second side of the plate,
        wherein each of the protrusions comprises an elastomer,
        wherein each of the protrusions comprises:
            a first head contacting the first battery cell of the adjacent battery cells; and
            a connecting member coupled to the first head and extending through be respective opening, wherein each of the protrusions further comprises a second head coupled to an end of the connecting member opposite the first head, the second head contacting the second battery cell of the adjacent battery cells, and wherein the first head is formed of a first material, and the second head is formed of a second material different than the first material.

17. A battery module comprising:

a plurality of battery cells spaced apart in a first direction; and a barrier between adjacent battery cells of the plurality of battery cells, the barrier comprising:

a plate having a plurality of openings formed therethrough from a first side of the plate to a second side of the plate opposite the first side; and plurality of protrusions extending through respective openings of the plurality of openings in the first direction and contacting a first battery cell of the adjacent battery cells at the first side of the plate and a second battery cell of the adjacent battery cells at the second side of the plate, wherein each of the protrusions comprises an elastomer, wherein each of the protrusions comprises:

a first head contacting the first battery cell of the adjacent battery cells; and a connecting member coupled to the first head and extending through the respective opening, wherein openings of the plurality of openings are arranged in a plurality of lines spaced apart from one another at intervals, and wherein first heads of the plurality of protrusions arranged in at least one first line of the plurality of lines are formed of a first material, and first heads of the plurality of protrusions arranged in at least one second line of the plurality of lines adjacent and alternating with the at least one first line are formed of a second material different than the first material.

18. The battery module of claim 17, wherein the protrusions further comprise second heads coupled to ends of the connecting members opposite the first heads, the second heads contacting the second battery cell of the adjacent battery cells, and wherein the second beads of the plurality of protrusions arranged in the at least one first line are formed of the second material, and the second heads of the plurality of protrusions arranged in the at least one second line are formed of the first material.

\* \* \* \* \*